Dec. 27, 1966 A. R. PHILLIPS, JR 3,294,439
AUTOMOBILE WINDOW SHIELD AND CLIP ASSEMBLY
Filed March 1, 1965

INVENTOR
ASA R. PHILLIPS, JR.
BY Raphael Semmes
ATTORNEY

United States Patent Office 3,294,439
Patented Dec. 27, 1966

3,294,439
AUTOMOBILE WINDOW SHIELD AND
CLIP ASSEMBLY
Asa R. Phillips, Jr., Atlanta, Ga.
(3571 Broad St., Chamblee, Ga. 30005)
Filed Mar. 1, 1965, Ser. No. 436,011
4 Claims. (Cl. 296—152)

This invention relates to a shield or shade of the type mounted above the window of an automobile door for the purpose of protecting the interior of the vehicle against the elements while providing for proper ventilation thereof. More particularly, the invention consists in new and useful improvements in an automobile window shield assembly of this character, including coacting clip means insertable in the upper window guiding channels of conventional automobile doors and adapted to secure the shield in operative position.

The primary object of the invention is to provide a shield for automobile door windows which may be installed without the necessity of in any way mutilating any part of the door and without the use of screws or similar securing means.

Another object of the invention is to provide a novel clip device which not only retains itself within the window channel through its resilient construction, but which coacts with means on a longitudinal edge of the window shield for securing the latter in place by the normal spring pressure of the clip.

A further object of the invention is to provide an automobile window shield assembly which may be easily installed in most conventional automobile door windows without the use of special tools or other equipment.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
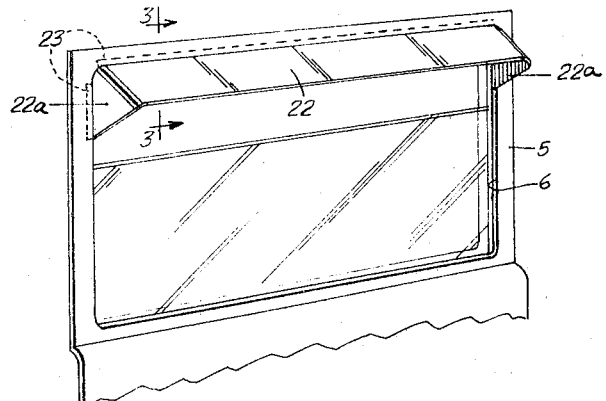
FIG. 1 is a perspective view showing the window shield of the present invention installed in the window of an automobile door.

In the drawings, the numeral 5 represents a conventional automobile door frame having a window opening 6 bounded on its vertical and upper horizontal edges by a window guiding channel 7. Ordinarily, these channels are formed of extruded metal and are shaped to provide a central throat 8 which terminates inwardly in a continuous bounding channel enlargement 9. The junction of the channel enlargement 9 and throat 8 provides a pair of oppositely disposed, longitudinally extending shoulders 10 and 11 which bound the upper extremity of the throat 8 and are normally adapted to coact with the conventional rubber or felt liner 12 for the window channel.

Figure 2:
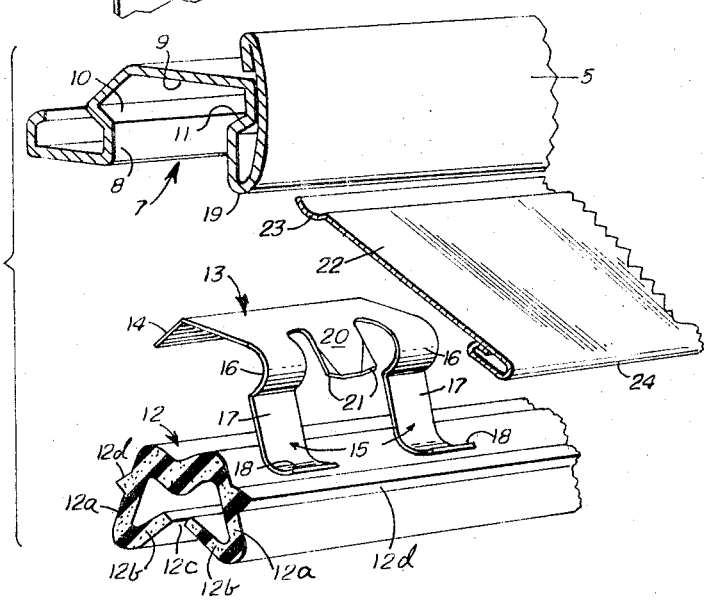
FIG. 2 is an exploded view, partially in section, illustrating the components of the invention and their relationship to the window frame of an automobile door.

Conventionally, these liners, as best seen in FIG. 2, are provided with downwardly and outwardly tensioned legs 12a having inwardly directed fins 12b spaced apart as at 12c to accommodate the window glass of an automobile door. Near the upper extremity of each of the legs 12a there is an outwardly projecting integral rib 12d designed to coact with the ledges or shoulders 10 and 11 in the channel 7 to retain the liner 12 in the channel, as shown in dotted lines in FIG. 3. The legs 12a of the liner 12 are normally outwardly tensioned so that when they are inserted within the throat 8 of the channel 7, they are inwardly compressed to restrict the opening or space 12c so as to tightly embrace the opposite faces of the window pane when the latter is inserted therebetween.

Figure 3:
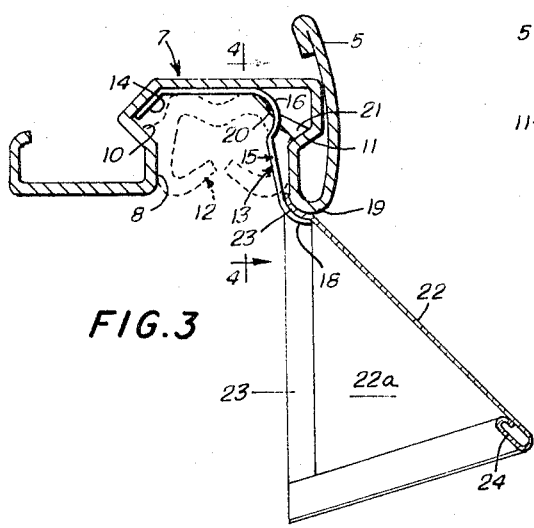
FIG. 3 is a transverse sectional view showing one of the retaining clips in place in the window channel.
Figure 4:
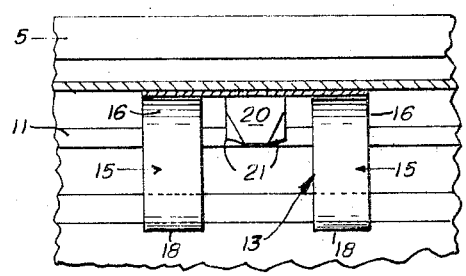
FIG. 4 is a longitudinal sectional view taken on line 4—4 of FIG. 3, showing the clip in place in the channel.

The resilient metal securing clip of the present invention is generally designated by the numeral 13, and, as best seen in FIGS. 2 and 3, is substantially U-shaped in cross-section. One longitudinal edge of the clip 13 forms an outwardly and angularly directed anchoring flange 14 of a depth to be received in the enlargement 9 of channel 7 in edgewise engagement with the shoulder 10. The opposite edge of the clip 13 is provided with a pair of longitudinally spaced, downwardly directed legs 15 which are outwardly tensioned and inwardly bowed at their upper extremities as at 16 to facilitate their spring action toward the adjacent wall of the window channel 7. The lower portions 17 of the legs 15 are straight and angularly disposed in the direction of the adjacent wall of the throat 8 when the clip is forced into place, as seen in FIG. 3, and the legs terminate at their lower extremities in outwardly directed, arcuately curved feet 18, designed to underlie the normally curved horizontal boundary 19 of the window opening 6.

Between the legs 15 and in inwardly spaced relation thereto, the edge of the clip is provided with a downwardly bent, angularly disposed locking tab 20, the opposite edges of which terminate adjacent the inwardly curved portions 16 of the legs 15 in small, outwardly directed barbs 21 which, as will later appear, are adapted to engage and bite into the shoulder 11 of the channel between the legs 15, when the clip is in place. As with the legs 15, the tab 20 is normally under an outward spring tension for locking the clip in place.

The shield per se is generally indicated by the numeral 22 and comprises an elongated rigid strip of sheet metal, stainless aluminum, plastic, or other suitable material. Preferably, this shield is downwardly curved at each end as at 22a to provide an awning effect over the window, as best seen in FIG. 1, and its inner longitudinal edge is shaped to form an arcuately curved ledge 23 (FIGS. 2 and 3). The upper horizontal ledge 23 is designed for engagement between the feet 18 of the clip and the curved boundary 19 of the window opening. The opposite longitudinal edge of the shield is preferably provided with a rolled bead or the like 24 for purposes of reinforcement and protection against injury from a sharp edge.

To install the shield assembly of the invention, the conventional rubber or felt liner 12, with which the automobile window is equipped, is first pulled out of the upper horizontal channel 7 by the use of a screwdriver or any other convenient instrument so as to free the channel. The shield is then placed in the window frame with the curved ledge 23 against the curved boundary 19 of the frame. With the shade held in this position, two or more of the resilient clips 13 are inserted edgewise in the channel through the throat 8 so that the free edge of the longitudinal flange 14 of each clip engages the shoulder 10 in the channel enlargement 9 to anchor the inner edge of the clip. By the use of any convenient pushing implement, such as a screwdriver or simply a wooden stick, the opposite side of the clip is then forced, with a pivoting or rotating motion, upwardly into the channel against the normal outward tension of the legs 15 until the curved portions 16 of the respective legs are disposed within the channel enlargement 9. In this position, the straight portions 17 of the legs are outwardly biased toward the adjacent surface of the throat 8 with the feet 18 directed outwardly and underlying the curved ledge 23 of the shield and the curved boundary 19 of the window opening, as seen in FIG. 3. As the clip is forced upwardly in the channel into the position just described, the outwardly tensioned locking tab 20 springs outwardly into the channel enlargement 9 and its barbs 21 engage the shoulder 11, as seen in FIG. 3, so that regardless of any inward springing movement of the legs, the clip is prevented from displacement by the engagement of the locking barbs 21 with the shoulder 11.

The channel liner 12 is then replaced in the channel where it is retained in its normal position by its own resiliency and the engagement of the ribs 12d with the respective shoulders 10 and 11. The lower straight portions 17 of the legs 15 now lie under outward tension toward the adjacent surface of the throat 8, and the feet 18 underlie the curved ridge 23 of the shield, securing the latter in place between the feet and the curved boundary 19 of the window opening.

Vertical ledges 23, at the downturned ends 22a of the shield, are extended inwardly further than the horizontal ledge of the shield for engagement between the liner 12 and the adjacent boundary of the channel 7. The shield is thus held substantially firmly in place and cannot be rocked inward or outward, while, at the same time, it is held upward in place by the clips located along the upper horizontal edge of the shield.

The particular clip illustrated and described is simply an example of one embodiment of the invention, and it will be understood that the specific contours of the clip may be altered to accommodate the varying contours of conventional automobile door window channels. Most of the window channels now in use are basically the same so that the construction and principle of operation here described may be readily adapted to practically all conventional automobiles.

It will be apparent that the invention provides a simple and inexpensive window shield which is easy to install and extremely simple in construction.

From the foregoing, it is believed that the invention may be readily understood by those skilled in the art without further description, it being borne in mind that numerous changes may be made in the details disclosed without departing from the spirit of the invention as set forth in the following claims.

I claim:

1. For an automobile door having a window frame, a window guiding channel disposed inwardly of said frame and having a portion which extends horizontally along the top of said frame, the opening of said horizontal channel being restricted to provide an elongated throat which opens into a lateral channel enlargement, the opposite junctions of said throat and enlargement forming parallel internal channel shoulders, and a channel liner in said channel; a window shield for outwardly overhanging the upper horizontal boundary of said window, in combination with resilient shield retaining clips engageable in said channel, each of said clips being substantially U-shaped in cross-section and provided along one longitudinal edge with an anchoring flange insertable in said enlargement and engageable with one of said shoulders, its opposite longitudinal edge being provided with downwardly directed spaced legs normally spring-biased outwardly toward the adjacent wall of said channel throat, said legs terminating at their lower extremities in outwardly curved feet adapted to resiliently underlie the inner horizontal boundary of said frame, said shield being bounded along one longitudinal edge by a complementary curved ledge adapted for interposition between said spring-biased feet and frame boundary, whereby said shield is secured against lateral displacement by its engagement, and means engageable with the other of said shoulders for locking said clip in said channel.

2. The combination as claimed in claim 1, wherein said clips are insertable in said channel between the latter and said channel liner.

3. The combination as claimed in claim 1, wherein said last-named means comprises a locking tab formed on said clip between said spaced legs, said locking tab being shorter than said legs and normally spring-biased outwardly for engagement with said channel shoulder.

4. The combination as claimed in claim 3, wherein said locking tab is provided with barbs for engagement with said channel shoulder.

References Cited by the Examiner
UNITED STATES PATENTS

| | | | |
|---|---|---|---|
| 2,134,054 | 10/1938 | Mabey | 296—152 |
| 2,199,134 | 4/1940 | Johnson | 296—152 |
| 2,599,015 | 6/1952 | Pritchard | 296—152 |

BENJAMIN HERSH, *Primary Examiner.*

P. GOODMAN, *Assistant Examiner.*